United States Patent [19]
Weber

[11] Patent Number: 4,647,241
[45] Date of Patent: Mar. 3, 1987

[54] MODULAR ASSEMBLY AND RETAINER THEREFOR

[76] Inventor: William J. Weber, 1331 Dennison, Apt. A, Springfield, Ill. 62704

[21] Appl. No.: 679,316

[22] Filed: Dec. 7, 1984

[51] Int. Cl.⁴ .......................... B25G 3/00; F16D 1/00
[52] U.S. Cl. ..................................... 403/18; 403/324; 403/378; 403/306; 403/205
[58] Field of Search ............... 403/378, 379, 324, 205, 403/403, 306, 305, 108, 18

[56] References Cited

U.S. PATENT DOCUMENTS

| | | | |
|---|---|---|---|
| 1,296,042 | 3/1919 | Bralove | 403/379 |
| 1,821,182 | 9/1931 | Hoppes | |
| 2,110,397 | 3/1938 | Kangas | 403/378 X |
| 2,238,561 | 4/1941 | Goodyear | |
| 2,260,048 | 10/1941 | Newell | 174/138 |
| 4,049,355 | 9/1977 | Kawazu | 403/172 |
| 4,183,691 | 1/1980 | Van Melle | 403/378 X |
| 4,353,661 | 10/1982 | Ruther | 403/205 X |

FOREIGN PATENT DOCUMENTS 84575 3/1958 Denmark .
826354 1/1938 France .
1400599 4/1965 France .

Primary Examiner—Andrew V. Kundrat
Attorney, Agent, or Firm—Lockwood, Alex, Fitzgibbon & Cummings

[57] ABSTRACT

A modular assembly is provided for use in frame structures which are assembled by joining frame members to connector or fitting members to allow such structures to be easily and quickly assembled and disassembled without the need for a separate assembly tool. In the assembly the frame member telescopically engages the fitting member and both members are constrained from relative rotational and translational movement by a resilient retainer. The retainer has a general spring-like band configuration which includes a backbone portion having two open extending ends. The retainer is flexed over one of the joined members and its backbone engages at least one half of the perimeter of that member. The installed and tensioned length between the two retainer ends is greater than the length between the same ends in a free state, thereby clamping the structural members together. An alignment pin extends radially inwardly from the retainer backbone and engages both members to lock the retainer in place.

25 Claims, 5 Drawing Figures

MODULAR ASSEMBLY AND RETAINER THEREFOR

BACKGROUND AND SUMMARY OF THE INVENTION

The present invention relates generally to an improved connector, and more particularly, to a sturdy and resilient connector assembly for joining a plurality of frame members together for use in the construction of frame structures which are capable of being easily assembled and disassembled.

Frame structures have been widely utilized in the past of structures such as playground apparatus, lawn and house furniture, and children's playcraft. One popular aspect of such structures is the ease and quickness with which they can be assembled or disassembled. As a result of this capability, these structures are commonly referred to "knock-down" structures. Typically, such knock-down structures comprise a plurality of frame members, such as hollow tubes or pipes, which are joined together by a variety of connector members or fittings such as elbow, tee or wye-type fittings. With these different fittings, an almost endless variety of structures can be built. Some sort of retainer is commonly provided for securing the individual members together to provide integrity to the structure assembled.

In U.S. Pat. No. 1,821,182, a coupling device is disclosed for connecting a frame tube to a fitting member. In this device, the fitting member includes a portion that is received by the frame tube and has internal inclined shanks that form a tapered pocket in the fitting which pocket receives a wedge block that is drilled to receive a nut and bolt. The frame tube is provided with a bolthole and is slid over the fitting. The tube bolthole and the wedge opening are then aligned with one another. A bolt is inserted through the bolthole into the wedge opening, to engage a nut that is held stationary by the wedge to prevent it from turning when the bolt is tightened. To secure the connection, the bolt must be tightened with a tool to expand the wedge against the shanks to force them outwardly against the frame tube inner wall. This coupling device therefore requires the use of a separate tool to tighten or loosen the bolt. Placing the wedge within the fitting shanks and aligning and tightening the bolt eliminates the "knock-down" advantage of the structure. Furthermore, the wedge and shanks of the fitting member must be separately formed which increases the cost and complexity of manufacture of such a device.

In U.S. Pat. No. 4,353,661, furniture, play and sport equipment is disclosed in which frame members and play-like connector members are joined together by a toggle. The frame members include cylindrical hollow tubes which receive the plug connectors within the ends of the pipes. The pipes have a circular opening dimensioned near their ends and the plug connectors have a non-circular opening in the ends which engage the pipes. These openings are aligned when the members are joined. The pipe and plug connectors are then secured to each other by means of a toggle which is inserted into aligned openings and rotated approximately one-quarter turn. A radially inner depending portion of the toggle frictionally engages the inner wall surface of the plug connector. This type of assembly would also require a separate tool to assemble or disassemble a structure and possibly adult supervision. The toggle connectors are small and might be easily lost by children. Furthermore, the toggle connector is limited to use only in an assembly in which one member has a non-circular opening.

The present invention is directed to a construction which avoids the aformentioned shortcomings.

In a connecting assembly incorporating the principles of the present invention, assembly and disassembly of frame structures may be accomplished easily and rapidly without the need for a separate tightening or assembly tool. Such an assembly may be accomplished by young children without the need for adult supervision. The individual components of the connecting assembly can be inexpensively manufactured. Additionally, the retainer that joins the members together can be used to assemble structural members that have either circular or non-circular openings therein.

In one principal aspect of the invention, a connecting assembly includes a frame member, a connecting or fitting member and means for joining the frame member to the fitting. The improvement in the means for joining the frame member with the fitting comprises means for aligning the fitting and frame members and means for flexibly retaining one member in engagement with the other to constrain the members from relative rotational or translational movement when assembled.

In another aspect of the invention, the flexible retaining means has a generally C-shaped overall configuration having a spring-like backbone portion defined between two free ends. When installed, the free ends extend over at least one-half of the outer perimeter of one of the frame and fitting members when they are joined together. The generally C-shape of the retaining means is installed on a fitting member. Due to its shape and spring-like characteristics, the retaining means when installed exerts a compressive force on the member it overlies and thereby firmly secures the fitting and frame members together. The resiliently flexible retaining means of the present invention is easily and quickly and snapped into its securing position and removed therefrom without the aid of tools. Additionally, the resiliently flexible retaining means can be adapted for use with existing structural frame members.

Accordingly, it is a general object of the present invention to provide a new and improved connector assembly for use in assembling frame structures.

Another object of the present invention is to provide retaining means for securing individual members of a frame structure which retaining means can be installed and removed without the aid of a separate tool.

It is yet another object of the present invention to provide retaining means for securing individual members of a structural frame which retaining means can be easily adapted for use with existing standard components.

It is still yet another object of the present invention to provide a reliable flexible and resilient retaining means for joining a frame member to a fitting or connecting member which retaining means constrains rotational and translational movement of individual members relative to each other.

These and other objects, features and advantages of the present invention will will be clearly understood through a consideration of the following detailed description.

BRIEF DESCRIPTION OF THE DRAWINGS

In the course of this description, reference will frequently be made to the attached drawings in which.

DESCRIPTION OF THE PREFERRED EMBODIMENT

The present invention is directed to an improved connecting assembly that may be incorporated in furniture or playground equipment or other "knock-down" frame structures.

Figure 1:
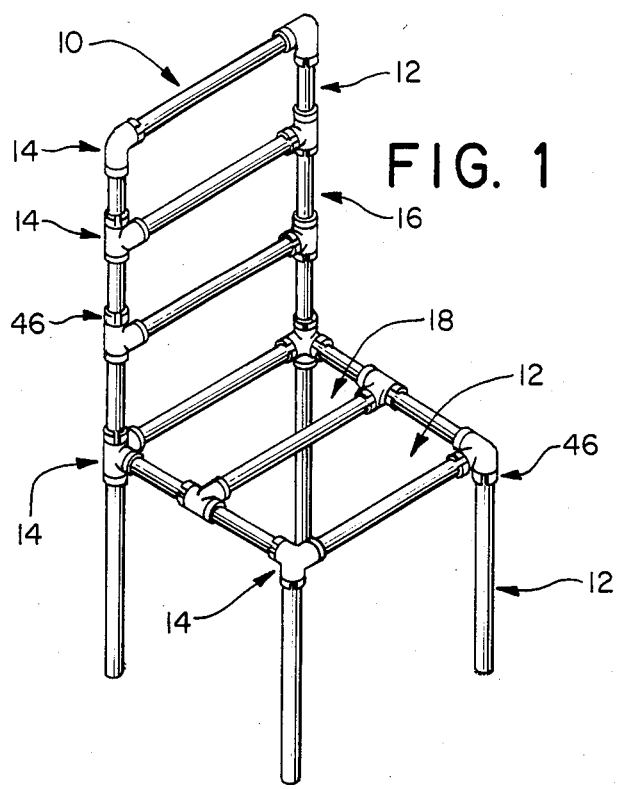
FIG. 1 is a perspective view of a structure assembled from structural components incorporating the present invention.

An overall perspective view of a chair constructed with connector assemblies incorporating the principles of the present invention as shown in FIG. 1. The chair 10 comprises a plurality of frame members 12, such as tee fittings, which are joined to a variety of connector or fitting members 14 by a plurality of retainers 46. The chair 10 can be seen to have a back portion 16 and a seat portion 18. The back portion 16 of the chair 10 utilizes connector members that are elbow fittings to join two frame members 12 together at approximately right angles, tee fittings which join three frame members together and a two-way tee fitting which joins the seat portion 18 to the chair back 18. The seat portion 18 includes frame members 12 joined together by tee fittings and modified elbow fittings which join three frame members at right angles to each other.

Other fitting configurations, such as cross or wye fittings, are not illustrated in the drawings, but may be used to join the frame members 12 to form other assembly shapes. The assembly thus far described is representative of a frame structure which may be constructed from distinct frame and fitting members.

Figure 2:
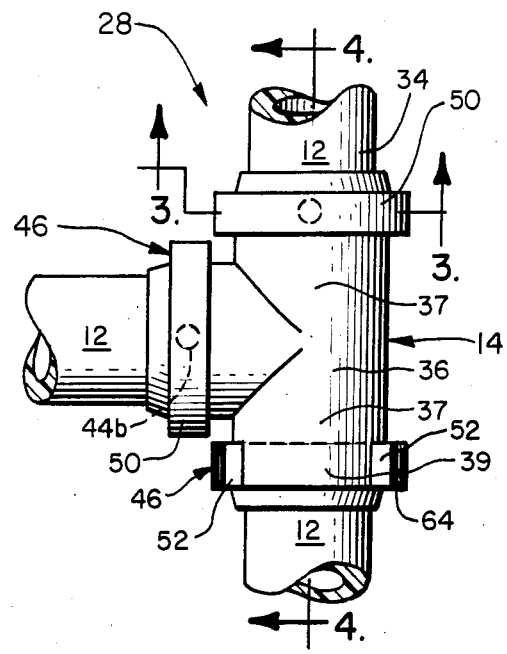
FIG. 2 is an enlarged fragmentary view of a portion of the structure shown in FIG. 1 illustrating a preferred embodiment of the connector assembly of the present invention.
Figure 3:
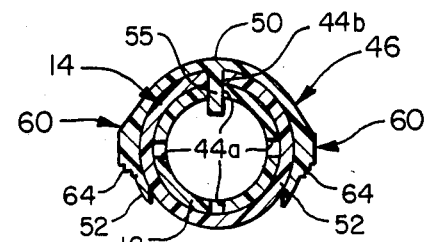
FIG. 3 is a sectional view taken along line 3-3 of FIG. 2.

An improved connector assembly, generally designated at 28 in FIG. 2, in accordance with the present invention includes a plurality of elongate frame members 12 that are joined to a plurality of connector or fitting members 14. The fitting and frame members are illustrated in the Figures as having a generally cylindrical cross-section; however, it will be appreciated that such members may be formed with other cross-sectional configurations such as rectangular or oval. The elongate frame members 12 may be of differing lengths so as to accomodate flexibility in the design and construction of the final frame structure. Frame members 12 are preferably hollow and are illustrated as tubes having a radial outer wall 30 and a radial inner wall 32. The frame members 12 terminate in end portions 34.

As shown more clearly in FIGS. 2-5, each fitting member 14 includes a body portion 36 having extending fixed end portions 37 integral therewith. The fitting 14 is also preferably hollow, the end portions 37 of which include an open chamber 38 defined within wall 39 of fitting 14. The cross-sectional configuration of the fitting end 37 is preferably complementary to the cross-sectional configuration of the frame member 12 such that the two members may be joined in telescopic engagement with each other. In this regard, one of the frame members 12 and fittings 14 has an inner diameter that is approximately equal to the other diameter of the other member to which it is joined. In the drawings, the end portions 37 of fitting 14 have their inner diameters approximately equal to the outer diameter of the frame members 12. The end 18 of frame member 12 can therefore be inserted into the chamber 38 of fitting end 37 in a telescopic relationship. The inner surface 43 of fitting wall 39 frictionally engages the outer wall 30 of the frame member 12.

Figure 4:
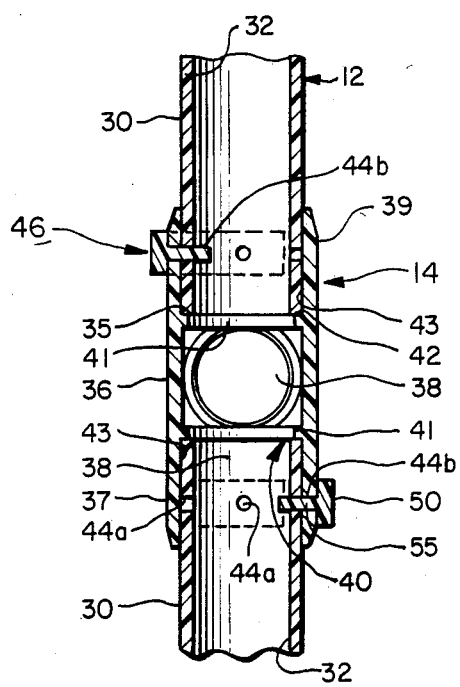
FIG. 4 is a sectional view taken along line 4-4 of FIG. 2.
Figure 5:
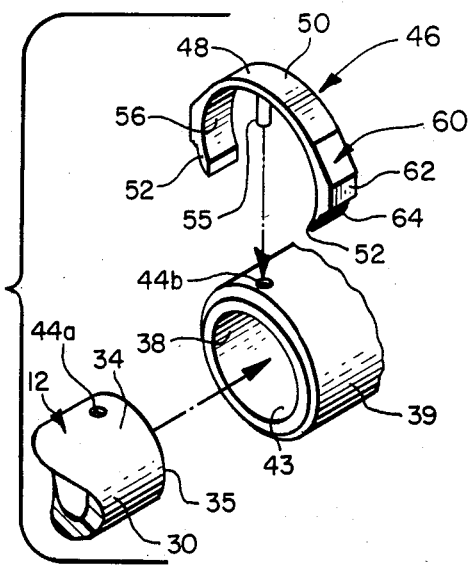
FIG. 5 is an exploded perspective fragmentary view of a portion of FIG. 2 illustrating the principal components thereof.

Means to align the telescopic engagement of the two members is generally indicated as 40, and as shown in FIG. 4, may include an inwardly projecting rib or abutment 41 having a stop surface 42 thereon. When the frame member 12 is inserted into fitting 14, the rim 35 of the frame member end 34 will abut the stop surface 42 of rib 41. The rib 41 and accompanying stop surface 42 may be formed by providing an additional wall thickness in the fitting body portion 36. It is to be understood that the fitting 14 may be dimensioned so as to allow it to be inserted into a frame member end 34. In this construction, a rib would be provided that projects inwardly from the frame member inner wall 32.

Openings 44a, 44b are provided in both the frame member and fitting end portions 34, 38, respectively, which assist in aligning the members to provide a proper connection therebetween. The openings 44a, 44b, which may have any configuration such as a circle, triangle, rectangle or hexagon to name just a few, are illustrated in the FIGS. as circular. Preferably, both openings 44a and 44b are of similar shape and size. These openings are located near the frame member and fitting end portions 34 and 37. Each fitting end 37 is provided with at least one opening 44b, the placement of which is arbitrary, while each end 34 of the frame member 12 is preferably provided with four such openings 44a equally spaced about the perimeter. This spacing allows fittings 14 to be oriented in any manner when joined to frame member 12. In assembly, the frame member 12 is inserted into and received by the open chamber 38 of the fitting end 37 such that the stop surface 42 of the fitting 14 substantially abuts the end rim 35 of the frame member 12, and the frame member is rotated therein to align the openings 44a, 44b in overlying relationship (FIG. 4).

Means to retain frame member 12 and fitting 14 in a secured interfitting relationship is provided in the form of a resilient flexible retainer, generally designated 46. This retainer 46 constrains rotational and translational movement of the frame member 12 and fitting 14 relative to one another and generally applies a compressive or gripping force to the member to which it is attached to minimize the likelihood of any disengagement thereof. The retainer 46 includes a collar 48 having a backbone portion 50 that terminates in two extending free end portions 52. In the embodiment illustrated, end portions 52 are integral with the backbone 50. Retainer 46 also includes a locking element shown as stud 54, which is generally centrally disposed on inner surface 56 of the collar 48 and projects radially inwardly therefrom. The stud 54 preferably has a cross-sectional configuration complementary to that of openings 44a, 44b and is dimensioned so as to be received therethrough.

The backbone portion 50 of the retainer 46 may be of a variety of shapes so as to impart a somewhat closed generally C-shaped configuration to the retainer 46. The retainer shown in FIGS. 1-5 is generally semi-circular, but it may also include other arcuate shapes and polygonal shapes such as rectangular. Perferably, the configuration of the retainer 46 will be similar to the frame member and fitting configurations.

Retainer 46 is preferably formed from a resilient material such as plastic or metal so as to allow it to be deformed into an installed configuration as will now be explained. When the retainer 46 is installed, it undergoes a deformation between its uninstalled and untensioned configuration and an installed and tensioned configuration. The difference between these two configurations can be defined in terms of the distance between the extending free end portions 52 of the retainer 46. The distance between these extending free end portions 52 is shortest when the retainer is uninstalled and is greatest when the retainer 46 is installed onto either the frame member 12 or the fitting end 37. The installation of the retainer 46 is relatively simple and serves to explain the retaining action of the connecting assembly of the present invention. Initially, the retainer is positioned onto the fitting end portion 38 such that the collar stud 54 is aligned with both the frame member and fitting openings 44a and 44b. As explained above, openings 44a, 44b are sized to accomodate the passage therethrough of the collar locking stud 54. The retainer 46 is then pressed by hand until its inner radial surface 56 substantially engages the outer wall 39 of fitting 14, whereupon the distance between the retainer end portions 52 increases, and the retainer 46 undergoes tension between its end portions 52. The inwardly projecting stud 54 of the collar 48 effectively constrains and discourages the aligned fitting 14 and frame members 12 from any significant rotational and translational movement relative to one another.

Since the retainer 46 relies upon its resilient nature and physical configuration, to connect the members 12 and 14 together, it will be understood that there is no need to make openings 44a, 44b similar in configuration so long as the openings 44a, 44b can accomodate the passage therethrough of collar stud 54.

The retainer 46 is preferably provided with a grip surface 60 located between its backbone 50 and extending free ends 52, which is illustrated in the drawings as a ridge 62. Ridge 62 has a series of indentations 64 on one side thereof. This outwardly extending grip surface 60 formed by ridge 62 allows the retainer 46 to be installed or removed by hand onto the members of the frame structure without the need for a separate tool. Since such a tool is not required, when the present invention is utilized for the construction of playground equipment for young children, there is no need for an adult to be present to supervise the assembly or disassembly of the frame structure. Additionally, the retainer 46 is of a relatively large size.

The individual components of the present invention lend themselves to being easily and simply produced by methods well known in the manufacturing arts, such as injection molding from a plastic material or stamping and extruding where a metal is used for construction.

While the preferred embodiment of the invention has been shown and described, it will be obvious to those skilled in the art that changes and modifications may be made therein without departing from the true spirit and scope of the invention.

What I claim is:

1. A modular assembly comprising:
   an elongate frame member having at least one end thereof capable of telescopically engaging with a fitting member;
   said fitting member having means for telescopically engaging said one end of said frame member;
   said frame member one end and said fitting member each having an aperture defined therein, each of said apertures being formed and positioned so as to be alignable with and in overlying relationship to one another when said frame member and said fitting member are telescopically engaged;
   removable retaining means for retaining said frame member in engagement with said fitting member when said frame member and said fitting member are telescopically engaged; and
   said retaining means including resiliently flexible means dimensioned to substantially engage the outer surface of said frame member and said fitting member when said members are telescopically engaged, said retaining means further including radially inwardly projecting locking means received in said apertures, whereby relative rotational and translational movement of said frame member and said fitting is discouraged when said frame member and said fitting member are engaged, said retaining means including means for gripping said retaining means to facilitate the easy installation and removal thereof by hand, said gripping means including an enlarged surface extending radially outwardly and forming a gripping ridge on said retaining means.

2. The modular assembly of claim 1, wherein at least one of said frame member and said fitting member includes means for registering said respective apertures of said frame member and said fitting member relative to each other.

3. The modular assembly of claim 2, wherein said registration means includes a stop surface on one of said members, said stop surface substantially abutting a surface of the other of said members, when said members are engaged.

4. The modular assembly of claim 1, wherein said frame member and said fitting member have a generally circular cross-sectional configuration and said apertures in said members are generally circular.

5. The modular assembly of claim 4, wherein said locking means includes a cylindrical stud that is received in said member apertures.

6. The modular assembly of claim 1, wherein said gripping ridge includes a serrated surface to facilitate the gripping thereof.

7. The modular assembly of claim 1, wherein said resiliently flexible means is deformable between an uninstalled and untensioned configuration and an installed and tensioned configuration and includes a collar having a width and thickness sufficient to exert a force upon the member to which it is applied, said force being adequate to retain said collar upon said member and further retain said member in engagement with said other member.

8. The modular assembly of claim 1, wherein said removable retaining means includes a flexible, spring-like collar of a generally C-shaped configuration, said collar having a backbone portion defined between two extending free ends thereof and further having an inner surface extending between said free ends along said backbone, said collar inner surface having a length approximately equal to at least one-half the outer perimeter of said member to which said collar is applied.

9. The modular assembly of claim 8, wherein the distance between said two free ends is greater in an installed and tensioned configuration than the distance between said free ends in an uninstalled and untensioned configuration.

10. The modular assembly of claim 7, wherein said locking means includes a cylindrical stud received in said member apertures, said stud being centrally disposed along an inner surface of said collar.

11. The modular assembly of claim 8, wherein the inner surface of said collar partially and frictionally engages approximately at least one-half of the outer peripheral surface of the member to which it is applied, thereby retaining said collar upon said member and further retaining said frame member and said fitting member in engagement.

12. A kit of parts for use in assembling a modular structure adapted to have individual elements which, when interfitted together, can be combined to form a frame structure, comprising:
at least one connector member having means for engaging and positioning at least one frame member within said connector member and having the same general cross-sectional configuration as the connector member, said frame member adapted to be indexed to a position of registration with said connector member; said connector member and said frame member each having an aperture formed therein, said respective apertures being formed and positioned in said members whereby said members can be aligned in overlying relationship with each other when said frame member is registered with said connector member; and
at least one removable retainer adapted to secure said frame member to said connector member when said members are engaged; said removable retainer including a locking element projecting from said retainer and received by said apertures, said locking element engaging said members, whereby movement of said members relative to each other is discouraged; said retainer further including a resilient and flexible collar having an inner surface that partially engages at least approximately one-half of the outer peripheral surface of said connector, said retainer having enlarged surfaces extending radially outwardly from said collar forming gripping ridges thereon, said ridges being positioned proximate to the open ends of said retainer and generally opposite each other whereby said retainer may be installed upon said connector member and removed by hand therefrom without the aid of tools.

13. A kit according to claim 12, wherein said connector and frame members have a generally circular cross-sectional configuration.

14. A kit according to claim 12, wherein said member apertures are circular and said locking element is cylindrical and has a cross-sectional configuration complimentary to said apertures.

15. A kit according to claim 12, wherein said ridges include a serrated surface thereon to facilitate the gripping thereof by hand.

16. A kit according to claim 12, wherein said collar has generally C-shaped configuration, having a backbone portion defined between two extending free ends thereof.

17. A kit according to claim 16, wherein the distance between said collar two free ends is greater in an installed and tensioned configuration than the distance between said free ends in an uninstalled and untensioned configuration.

18. A kit according to claim 11, wherein said locking element projects radially inwardly from said backbone of said collar and is centrally disposed thereupon.

19. A kit according to claim 17, wherein said inner surface of said retainer partially and frictionally engages the outer peripheral surface of said connector.

20. A removable retainer of the type for securing two structural elements in connection together by hand assembly or disassembly, said elements telescopically engaging the other element and indexed to a position of registration with said other element, each of said elements having an aperture positioned therein so as to allow alignment of said element apertures in overlying relationship to each other when said elements are indexed to said position of registration, wherein said removable retainer comprises:
a flexbile, spring-like collar of a generally C-shaped configuration and having a backbone portion defined between two extending free ends and an inner surface extending between said free ends along said backbone portion, said inner surface including a locking element projecting radially inwardly from said inner surface and disposed between said collar free ends, said locking element adapted to engage each aperture of said structural elements when said elements are aligned and telescopically engaged, said collar including ridges between said collar backbone portion and said collar free ends, said ridges including enlarged surfaces extending radially outwardly from said collar and further including serrated surfaces thereon to facilitate the installation or removal of said retainer on said two structural elements by hand.

21. The retainer of claim 20, wherein said collar has a structure such that the distance between said free ends in an installed and tensioned configuration is greater than the distance between said free ends in an uninstalled and untensioned configuration, thereby imparting a bias to said structural element when said retainer is installed upon and engages said structural elements.

22. The retainer of claim 21, wherein said flexible spring-like collar is deformable between an uninstalled, untensioned configuration and bias-imparting configuration and an installed, tensioned and bias-imparting configuration, said bias-imparting configuration being such that the distance between said free ends is greater for said bias imparting configuration than for said uninstalled and untensioned configuration.

23. The retainer of claim 22, wherein said flexible, spring-like collar has a width and thickness sufficient to exert a force upon said structural elements, said force being adequate to retain said collar upon said elements and to discourage movement of said elements relative to each other.

24. The retainer of claim 20, wherein said collar inner surface partially and frictionally engages at least approximately one-half of the outer peripheral surface of the structural element to which it is applied.

25. The retainer of claim 20, wherein said locking element includes a cylindrical stud having a cross-sectional configuration generally complimentary to said element apertures.

* * * * *